April 12, 1932.  W. SLUZELE  1,853,935
STATION INDICATOR
Filed July 18, 1930
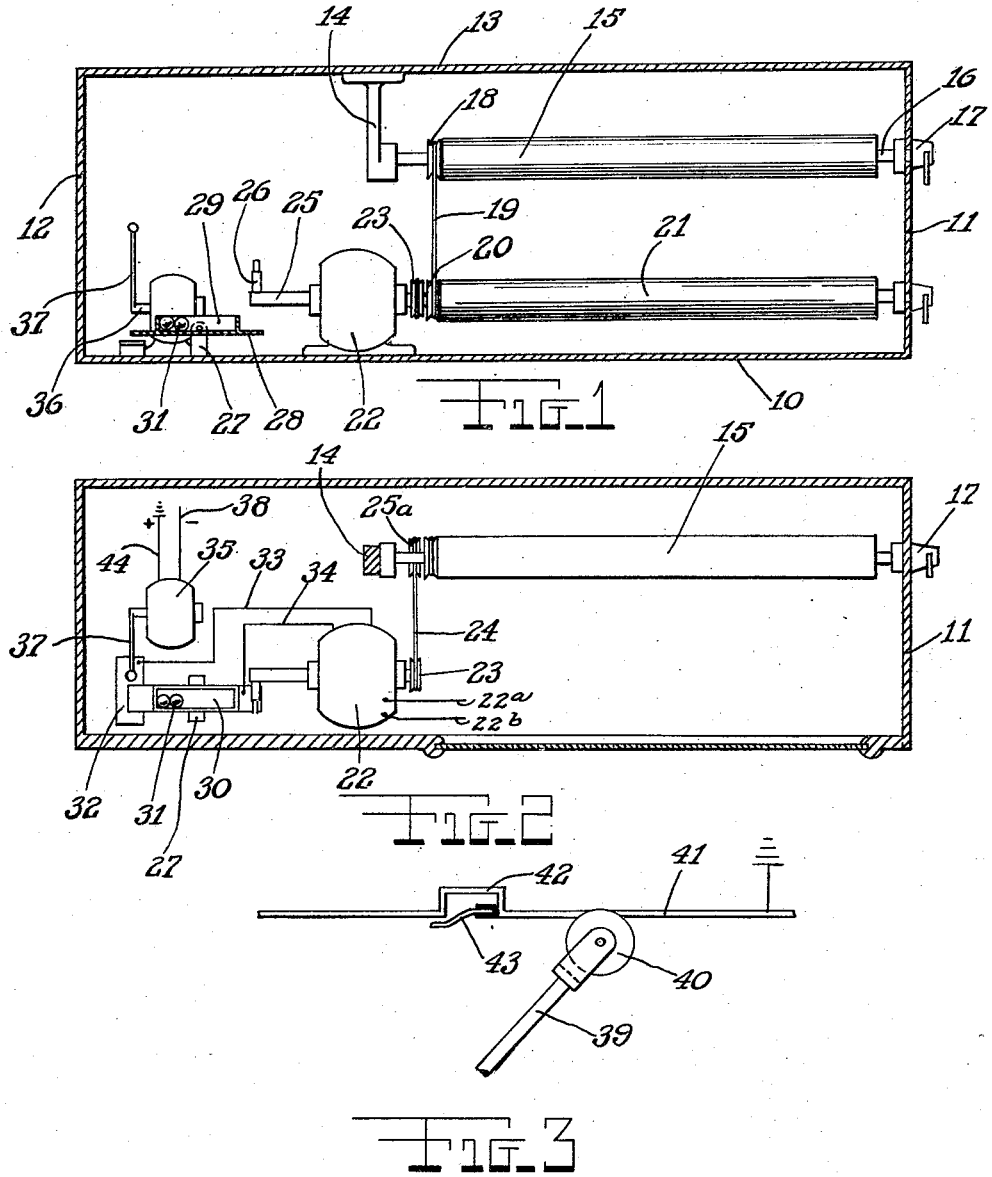
Inventor
W. Sluzele
By his Attorney F. Ledermann Patented Apr. 12, 1932

1,853,935

UNITED STATES PATENT OFFICE

WALTER SLUZELE, OF NEWARK, NEW JERSEY

STATION INDICATOR

Application filed July 18, 1930. Serial No. 468,948.

The main object of this invention is to provide a device whereby stations may be visibly indicated in a tram through an electrically operated mechanism, which is operated by contacts located on the trolley wire at designated positions.

The above and other objects will become apparent in the description below in which characters of reference refer to like-named parts in the drawings.

Referring briefly to the drawings, Figure 1 is a front elevational view of the mechanism showing the same located in a casing.

Figure 2 is a cross sectional top plan view of the casing showing the mechanism therein.

Figure 3 is a longitudinal elevational view of a trolley wire and trolley showing the means of closing a contact through the device.

Referring in detail to the drawings, the numeral 10 indicates the floor of a boxlike casing which is provided with side walls 11 and 12 and a roof 13. Suspended from the roof is a bracket 14 which journals one end of a drum 15, upon which is secured one end of a curtain not shown on the drawings. The opposite end of this drum has a shaft 16 extending therefrom, which is connected to a winged nut 17 and is journalled in the side wall 11 of the box. A grooved pulley 18 is mounted adjacent to and integral with the drum 15 and has one end of an endless belt 19 trained thereabout. This endless belt is also trained about a second pulley 20 which is mounted on the end of a second drum 21 about which the other end of the curtain previously mentioned is secured. This second drum 21 is journalled in a post located behind a motor 22 and in the wall 11 of the box. The motor 22 is provided with a grooved pulley 23 about which a belt 24 is trained. This motor is energized by an electrical source which circulates through the wires 22a and 22b. The latter is also trained about a fourth pulley 25a which is secured to the shaft carrying the drum 21. The spindle 25 of the motor 22 is provided with a flexible radial finger 26 for purposes which will be more fully hereinafter described. Arranged at a short distance from the end of the spindle are a pair of spaced apart posts 27 between which a balancing plate 28 is pivotally anchored. This plate has a four sided flange mounted thereon forming a channel 30 in which a pair of weighted pulleys 31 roll. One end of the plate 28 projects beneath the spindle 25 and is engageable by the flexible finger 26, upon rotation of the spindle. The opposite end of the balancing plate 28 is superimposed upon a circuit closing plate 32 which has a lead wire 33 extending from it to one of the terminals of the motor, 22. A second lead wire 34 extends to the balancing plate 28 to which it is secured. A second small motor 35 is mounted upon the floor 10 of the box or casing, and the spindle 36 of this motor has an arm 37 thereon, which is provided with a balled head and is adapted to contact with one of the ends of the balancing plate 28. This shaft 36 makes a partial revolution to swing arm 37 to engaging position with plate 28. A trolley pulley 39 has a grooved roller 40 thereon which rides upon a trolley roller 41 electrically grounded. At predetermined positions along the road where the trolley travels and at positions where the station stops are to occur, the trolley wire is deformed into U-shaped portions. At each one of these deformed portions of the trolley wire an insulated finger 43 is mounted. A lead wire 38 leading to the motor 35 is connected to each of these fingers and said fingers are separated from the lead wire by a gap in such manner that when the grooved roller 40 rides over the finger, it will exert an upward pressure on the upper end of the latter and will cause said finger to contact with the trolley wire and shunt current into the motor 35 through the lead wire 38. The opposite terminal of the motor 35 is grounded through a lead wire 44.

Upon energization of the motor by current passing through lead wire 38 at the instant the trolley strikes a section 42, the spindle 36 is partially rotated to bring the arm 37 down upon the left-hand end (Figures 1 and 2) of the plate 28, thereby tilting the latter toward the left to bring said end of plate 28 into contact with contact 32, at the same time causing the pellets 31 to roll to the left end of channel 30. The motor 22, energized by the closing of its circuit through plate 28 and contact 32, is rotated through a partial revolution, thus causing rotation of the curtain carrying drums 15 and 21, as described. As soon as the motor 22 has completed this partial revolution, the finger 26 on its spindle 25, strikes the right-hand end of plate 21 and tilts it to the right, thus again opening the circuit through motor 22. This causes the pellets 31 to roll back to the right end of the channel 30, and at the same time, the rising left-hand end of the plate 28, throws the arm 37 back to its original position, the weight of the pellets 31 causing the plate 28 to remain in its original inactive position, tilted to the right. When the trolley passes the next section 42, the operation is repeated.

It is to be noted that certain changes in form and construction may be made without departing from the spirit and scope of the invention.

I claim:

1. In a station indicator, a pair of curtain rolls, a motor for rotating said curtain rolls, an auxiliary motor, a circuit breaker for energizing said first-named motor comprising a balancing plate, a box-like structure having a channel therein on said balancing plate, said balancing plate being pivoted intermediate its length, means on said auxiliary motor for tilting said plate in one direction upon energization of said auxiliary motor, said balancing plate being adapted upon being tilted in said direction to close a circuit through said first-named motor, means on said first-named motor adapted to strike said plate upon rotation of said first-named motor to tilt said plate in the opposite direction to open said circuit, and means in said channel for retaining said plate tilted into inactive position.

2. In a device of the class described, a motor adapted to be energized upon contact of the trolley with a given point on the trolley wire and to remain energized only during the continuation of said contact, an arm rigid with the armature spindle of said motor, a balancing plate pivotally supported at its middle and adapted to be tilted in either direction about its pivot, said plate having a channel therein extending from one side of the pivot to the opposite side, pellets freely moveable in said channel along the direction of the channel, a stationary contact mounted beneath one end of said plate, said arm upon rotation of said motor being adapted to tilt said end of the plate downward into contact with said stationary contact, said pellets moving to the direction of said end upon said tilting of the plate, a plurality of drums having curtains trained thereabout, a second motor adapted to rotate said drums, a finger on the armature spindle of said second motor adjacent the other end of said plate, said other end lying in the path of said finger upon rotation of said second motor, said first-named end of the plate and said stationary contact being in circuit with said second motor and being adapted to close the circuit therethrough, said second motor upon energization rotating said finger and causing tilting of said plate in the opposite direction, causing the first-named end of the plate to be lifted out of contact with said stationary contact and open said circuit through the second motor, said tilting of the plate in the reverse direction causing said pellets to move to the opposite end of said channel and to retain said plate in its original inactive position.

In testimony whereof I affix my signature.

WALTER SLUZELE.